United States Patent
Shao et al.

(10) Patent No.: US 9,867,149 B2
(45) Date of Patent: Jan. 9, 2018

(54) POWER CONFIGURATION METHOD, USER EQUIPMENT, AND BASE STATION

(71) Applicant: Huawei Technologies Co., Ltd., Shenzhen (CN)

(72) Inventors: Jiafeng Shao, Beijing (CN); Bingyu Qu, Beijing (CN); Qiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/672,103

(22) Filed: Aug. 8, 2017

(65) Prior Publication Data

US 2017/0339647 A1    Nov. 23, 2017

Related U.S. Application Data

(63) Continuation of application No. 15/295,852, filed on Oct. 17, 2016, now Pat. No. 9,763,204, which is a
(Continued)

(51) Int. Cl.
*H04W 52/34* (2009.01)
*H04W 52/36* (2009.01)
(Continued)

(52) U.S. Cl.
CPC ....... *H04W 52/346* (2013.01); *H04W 52/281* (2013.01); *H04W 52/34* (2013.01);
(Continued)

(58) Field of Classification Search
CPC ... H04W 52/34; H04W 52/40; H04W 52/281; H04W 52/367; H04W 72/004; H04B 7/024
See application file for complete search history.

(56) References Cited

U.S. PATENT DOCUMENTS

2013/0053088 A1* 2/2013 Thorson ............... H04B 1/525
                                                          455/522
2013/0114505 A1   5/2013 Haim et al.
(Continued)

FOREIGN PATENT DOCUMENTS

CN    103220768 A    7/2013
CN    103634887 A    3/2014
(Continued)

OTHER PUBLICATIONS

3GPP TS 36.104, 3rd Generation Partnership Project; Technical Specification Group Radio Access Network; Evolved Universal Terrestrial Radio Access (E-UTRA); Base Station (BS) radio transmission and reception (Release 12), Mar. 2014. 149 pages, V12.3.0, Valbonne, France.
(Continued)

*Primary Examiner* — Tuan Pham
(74) *Attorney, Agent, or Firm* — Slater Matsil, LLP

(57) ABSTRACT

In response to a user equipment (UE) sending data to a first network side device over a first channel and to a second network side device over a second channel, a method includes determining that the first channel separately overlaps the second channel and a third channel. The method further includes allocating, according to priorities of the first channel and the second channel, a first transmit power to the first subframe j and a second transmit power to the second subframe i. The first transmit power is less than or equal to a first power upper limit. A sum of the first transmit power and the second transmit power is less than or equal to a first threshold. A sum of third transmit power of the third subframe i+1 and the first power upper limit is less than or equal to a preset second threshold.

10 Claims, 6 Drawing Sheets

Related U.S. Application Data continuation of application No. PCT/CN2014/075723, filed on Apr. 18, 2014.

(51) Int. Cl.
| | |
|---|---|
| *H04W 52/40* | (2009.01) |
| *H04W 72/10* | (2009.01) |
| *H04W 52/28* | (2009.01) |
| *H04W 72/04* | (2009.01) |
| *H04W 72/08* | (2009.01) |
| *H04W 52/24* | (2009.01) |
| *H04B 7/024* | (2017.01) |

(52) U.S. Cl.
CPC ......... *H04W 52/367* (2013.01); *H04W 52/40* (2013.01); *H04W 72/10* (2013.01); *H04B 7/024* (2013.01); *H04W 52/243* (2013.01); *H04W 72/0446* (2013.01); *H04W 72/082* (2013.01)

(56) References Cited

U.S. PATENT DOCUMENTS

| | | | |
|---|---|---|---|
| 2013/0229930 A1* | 9/2013 | Akay ............... | H04W 52/0245 370/252 |
| 2014/0050205 A1 | 2/2014 | Ahn et al. | |
| 2015/0163750 A1 | 6/2015 | Zhang et al. | |
| 2016/0242121 A1 | 8/2016 | Lin et al. | |

FOREIGN PATENT DOCUMENTS

| | | |
|---|---|---|
| EP | 3105980 A1 | 12/2016 |
| WO | 2015122695 A1 | 8/2015 |

OTHER PUBLICATIONS

3GPP TS 36.213, 3rd Generation Partnership Project; Technical Specification Group Radio Access Network; Evolved Universal Terrestrial Radio Access (E-UTRA); Physical layer procedures (Release 12), Mar. 2014, 186 pages, V12.1.0, Valbonne, France.

3GPP TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Mar. 2014, 209 pages, V12.1.0, Valbonne, France.

Fujitsu, "Power allocation strategy for power limited UEs in dual-connectivity," 3GPP TSG RAN WG1 Meeting #76bis, R1-141227, Mar. 31-Apr. 4, 2014, 6 pages, Shenzhen, China.

LG Electronics, "Proposal on maximum power definition in dual connectivity," 3GPP TSG RAN WG1 Meeting #76bis, R1-141861, Mar. 31-Apr. 4, 2014, 2 pages, Shenzhen, China.

Samsung, "UL Power Control in Dual Connectivity," 3GPP TSG RAN WG1 Meeting #76bis, R1-141293, Mar. 31-Apr. 4, 2014, 2 pages, Shenzhen, China.

\* cited by examiner

POWER CONFIGURATION METHOD, USER EQUIPMENT, AND BASE STATION

CROSS-REFERENCE TO RELATED APPLICATIONS

This application is a continuation of U.S. patent application Ser. No. 15/295,852, filed on Oct. 17, 2016, which is a continuation of International Application No. PCT/CN2014/075723, filed on Apr. 18, 2014. All of the aforementioned patent applications are hereby incorporated by reference in their entireties.

TECHNICAL FIELD

This disclosure relates to the field of communications technologies, and in particular embodiments, to a power configuration method, user equipment, and a base station.

BACKGROUND

Long Term Evolution-Advanced (LTE-A) is a further evolved and enhanced system of a 3GPP LTE system. In the LTE-A system, a carrier aggregation (CA) technology is introduced to meet a peak data rate requirement of International Telecommunication Union on the fourth generation communications technology. In carrier aggregation, spectrums of two or more component carriers (CC) are aggregated to obtain wider transmission bandwidth, where the spectrums of the component carriers may be adjacent continuous spectrums, or may be intra-band non-adjacent spectrums or even inter-band discontinuous spectrums. LTE-A user equipment can access, according to a capability and a service requirement of the LTE-A user equipment, multiple component carriers at the same time to send and receive data.

In a subsequent evolved LTE-A system, inter-base-station carrier aggregation, that is, dual connectivity (DC), is introduced. In this case, backhaul between base stations is non-ideal, and data cannot be transferred in real time between the base stations. In a DC scenario, two base stations may be asynchronous, that is, there is any time difference between start moments of downlink transmit subframes of the two base stations. Further, in this asynchronous DC scenario, multiple uplink channels that are sent by user equipment UE to two network side devices overlap. Specifically, referring to FIG. 1, a first channel overlaps a second channel and a third channel, where user equipment UE sends data to a secondary network side device SeNB over the first channel, and the user equipment sends data to a master network side device MeNB over the second channel and the third channel. An overlap portion exists between a first portion of a first subframe j in which the first channel is located and a second subframe i in which the second channel is located, and for ease of description, is referred to as a first overlap area. Further, an overlap portion exists between a second portion, other than the first portion, of the first subframe j and a third subframe i+1 in which the third channel is located, and for ease of description, is referred to as a second overlap area. The third subframe i+1 is a next subframe of the second subframe i, and the third subframe i+1 is used to send data to the master network side device.

In the asynchronous DC scenario in FIG. 1, a method for configuring power for all subframes in the prior art is: allocating power to the first subframe j and the second subframe i according to priorities of the first channel and the second channel, where all portions of the first subframe j are transmitted at equal power, that is, all symbols of the first subframe j are sent at equal power, and even though the second overlap area exists, the third subframe i+1 can be transmitted only at remaining power after allocation to the first subframe j.

For example, the first channel is a physical uplink control channel (PUCCH), and the second channel is a physical uplink shared channel (PUSCH). In existing power configuration, a priority of the PUCCH is higher than a priority of the PUSCH, so a channel priority of the first channel is higher than a channel priority of the second channel. Therefore, power is first allocated to the PUCCH in the first subframe j, and then power is allocated to the PUSCH in the second subframe i. According to the foregoing allocation method, if power of the first channel remains unchanged, even though the third channel is a PUCCH channel, that is, a priority of the third channel is higher than or equal to the priority of the first channel, only the remaining power can be allocated to the third channel in the third subframe i+1 because maximum transmit power of the UE is limited within one time segment. As a result, power allocated to the third subframe may not reach required power of the third frame, and transmission performance of the third subframe is affected.

However, in the foregoing scenario, when the UE is in a DC mode, the master network side device is responsible for sending and receiving of all radio resource control (RRC) control information of the UE, while the secondary network side device does not send or receive such information. Therefore, if types of uplink channels sent by the UE to the two network side devices or priorities of uplink control information carried in the uplink channels are the same, it is generally considered that an uplink channel sent to the master network side device is more important, and power should be preferentially allocated to this uplink channel.

Therefore, according to technical solutions in the prior art, although transmission at equal power in the first subframe j ensures correct reception of the first channel, when the priority of the third subframe i+1 is higher than the priority of the first subframe j, the third subframe i+1 to which enough transmit power should be preferentially allocated does not obtain corresponding transmit power, and consequently, power allocation to important information cannot be ensured in asynchronous DC.

SUMMARY

This disclosure provides a power configuration method, user equipment, and a base station, so as to resolve a technical problem existing in the prior art that because of improper power allocation when user equipment sends data over multiple channels, power allocation to important information cannot be ensured.

A first aspect of this disclosure provides a power configuration method, including the following. The method includes determining that the first channel separately overlaps the second channel and a third channel when user equipment UE sends data to a first network side device over a first channel and the UE sends data to a second network side device over a second channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device. The method also includes allocating, according to a priority of the first channel and a priority of the second channel, first transmit power to the first portion of the first subframe j and the second portion of the first subframe j, and second transmit power to the second subframe i, where the first transmit power is less than or equal to a first power upper limit, a sum of the first transmit power and the second transmit power is less than or equal to a preset first threshold, and a sum of third transmit power of the third subframe i+1 and the first power upper limit is less than or equal to a preset second threshold.

With reference to the first aspect, in a first possible implementation manner of the first aspect, before the allocating, according to a priority of the first channel and a priority of the second channel, first transmit power to the first portion of the first subframe j and the second portion of the first subframe j, and second transmit power to the second subframe i, the method further includes: determining the third transmit power according to at least a priority of the third channel and the priority of the first channel; and determining the first power upper limit according to the second threshold and the third transmit power.

With reference to the first possible implementation manner of the first aspect, in a second possible implementation manner of the first aspect, before the determining the third transmit power according to at least a priority of the third channel and the priority of the first channel, the method further includes determining that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device. The determining the third transmit power according to at least a priority of the third channel and the priority of the first channel includes determining transmit power of the first portion of the third subframe i+1 according to the priority of the third channel and the priority of the first channel. The determining the third transmit power according to at least a priority of the third channel and the priority of the first channel also includes determining transmit power of the second portion of the third subframe i+1 according to the priority of the third channel and a priority of the fourth channel. The determining the third transmit power according to at least a priority of the third channel and the priority of the first channel further includes determining the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

With reference to the first aspect, in a third possible implementation manner of the first aspect, after the first subframe j and the second subframe i are sent, the method further includes: determining that the fourth channel separately overlaps the third channel and a fifth channel, when the UE sends data to the first network side device over a fourth channel and the UE sends data to the second network side device over the third channel, where an overlap portion exists between a first portion of a fourth subframe j+1 in which the fourth channel is located and the third subframe i+1; and an overlap portion exists between a second portion, other than the first portion, of the fourth subframe j+1 and a first portion of a fifth subframe i+2 in which the fifth channel is located, where the fifth subframe i+2 is a next subframe of the third subframe i+1, and the fifth subframe i+2 is used to send data to the second network side device. The method further includes allocating, according to a priority of the fourth channel and a priority of the third channel, fourth transmit power to the first portion of the fourth subframe j+1 and the second portion of the fourth subframe j+1, and actual transmit power to the third subframe i+1, where the fourth transmit power is less than or equal to a third power upper limit, and the actual transmit power is less than or equal to a difference between the second threshold and the first power upper limit; a sum of the fourth transmit power and the actual transmit power is less than or equal to a preset fifth threshold; and a sum of fifth transmit power of the fifth subframe i+2 and the third power upper limit is less than or equal to a preset sixth threshold.

With reference to the first aspect, in a fourth possible implementation manner of the first aspect, before the allocating, according to a priority of the first channel and a priority of the second channel, first transmit power to the first portion of the first subframe j and the second portion of the first subframe j, and second transmit power to the second subframe i, the method further includes: determining that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; determining transmit power of the first portion of the third subframe i+1 according to a priority of the third channel and the priority of the first channel; determining transmit power of the second portion of the third subframe i+1 according to the priority of the third channel and a priority of the fourth channel; and determining the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

With reference to the fourth possible implementation manner of the first aspect, in a fifth possible implementation manner of the first aspect, before the determining the third transmit power according to the transmit power of the first portion of the third subframe i+1 and the transmit power of the second portion of the third subframe i+1, the method further includes: determining the fourth transmit power according to the priority of the third channel and the priority of the fourth channel; and determining the second power upper limit according to the third threshold and the fourth transmit power.

With reference to the first aspect or any one of the first possible implementation manner of the first aspect to the fifth possible implementation manner of the first aspect, in a sixth possible implementation manner of the first aspect, before the allocating first transmit power to the first portion of the first subframe j and the second portion of the first subframe j, and second transmit power to the second subframe i, the method further includes: determining that a current mode of the UE is an asynchronous dual connectivity DC mode.

With reference to the first aspect or any one of the first possible implementation manner of the first aspect to the fifth possible implementation manner of the first aspect, in a seventh possible implementation manner of the first aspect, before the allocating, by the UE, first transmit power to the first portion and the second portion, other than the first portion, of the first subframe j, and second transmit power to the second subframe i of the second channel, the method further includes: receiving, by the UE, reference time window information sent by the first network side device or the second network side device, where the reference time window information is used to determine a subframe that needs to be used as a reference during allocation of the first transmit power and the second transmit power.

With reference to the first aspect or any one of the first possible implementation manner of the first aspect to the fifth possible implementation manner of the first aspect, in an eighth possible implementation manner of the first aspect, before the allocating, by the UE, first transmit power to the first portion and the second portion, other than the first portion, of the first subframe j, and second transmit power to the second subframe i of the second channel, the method further includes: at least determining that the priority of the third channel is higher than or equal to the priority of the fourth channel.

With reference to the first aspect or any one of the first possible implementation manner of the first aspect to the eighth possible implementation manner of the first aspect, in a ninth possible implementation manner of the first aspect, when the priority of the first channel is higher than the priority of the second channel, the allocating first transmit power to the first portion of the first subframe j and the second portion of the first subframe j, and second transmit power to the second subframe i includes: determining whether required power of the first subframe j is greater than the first power upper limit when the required power is greater than the first power upper limit, compressing the required power to obtain the first transmit power that is less than or equal to the first power upper limit, or determining the first power upper limit as the first transmit power; or when the required power is less than or equal to the first power upper limit, using the required power as the first transmit power; and allocating, to the second subframe i, the second transmit power that is less than or equal to a difference between the first threshold and the first transmit power.

With reference to the first aspect or any one of the first possible implementation manner of the first aspect to the eighth possible implementation manner of the first aspect, in a tenth possible implementation manner of the first aspect, when the priority of the first channel is equal to the priority of the second channel, the allocating first transmit power to the first portion of the first subframe j and the second portion of the first subframe j, and second transmit power to the second subframe i includes: determining first required sub-power of the first subframe j and second required sub-power of the second subframe i, and determining whether a power sum of the first required sub-power and the second required sub-power is greater than the first threshold; and when the power sum is less than or equal to the first threshold, using a smaller value of the first required sub-power and the first power upper limit as the first transmit power, and using the second required sub-power as the second transmit power; or when the power sum is greater than the first threshold, compressing the first required sub-power and the second required sub-power in equal proportion, to respectively obtain first compressed required sub-power corresponding to the first required sub-power and second compressed required sub-power corresponding to the second required sub-power, where a sum of the first compressed required sub-power and the second compressed required sub-power is less than or equal to the first threshold; and using a smaller value of the first compressed required sub-power and the first power upper limit as the first transmit power, and allocating, to the second subframe i, the second transmit power that is less than or equal to a difference between the first threshold and the first transmit power.

With reference to the first aspect or any one of the first possible implementation manner of the first aspect to the eighth possible implementation manner of the first aspect, in an eleventh possible implementation manner of the first aspect, the second transmit power is less than or equal to a difference between a fourth threshold and the third power upper limit of a subframe j−1, where the subframe j−1 is a previous subframe of the first subframe j, and the subframe j−1 is used to send data to the first network side device.

With reference to the first aspect or any one of the first possible implementation manner of the first aspect to the eleventh possible implementation manner of the first aspect, in a twelfth possible implementation manner of the first aspect, before the allocating first transmit power to the first portion of the first subframe j and the second portion of the first subframe j, and second transmit power to the second subframe i, the method further includes: determining that the first network side device is a secondary network side device SeNB; and determining that the second network side device is a master network side device MeNB.

A second aspect of this disclosure further provides a power configuration method, including: sending reference time window information to user equipment UE, where the reference time window information is used to indicate, to the UE, a subframe that needs to be used as a reference during allocation of first transmit power to a first subframe j in which a first channel is located and second transmit power to a second subframe i in which a second channel is located; and receiving data on the first channel sent by the UE at the first transmit power or data on the second channel sent by the UE at the second manner power.

A third aspect of this disclosure further provides user equipment, including: a first determining unit, configured to: when the user equipment sends data to a first network side device over a first channel and the user equipment sends data to a second network side device over a second channel, determine that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device. The user equipment also includes an allocation unit, configured to allocate, according to a priority of the first channel and a priority of the second channel, first transmit power to the first portion of the first subframe j and the second portion of the first subframe j, and second transmit power to the second subframe i, where the first transmit power is less than or equal to a first power upper limit, a sum of the first transmit power and the second transmit power is less than or equal to a preset first threshold, and a sum of third transmit power of the third subframe i+1 and the first power upper limit is less than or equal to a preset second threshold.

With reference to the third aspect, in a first possible implementation manner of the third aspect, the user equipment further includes: a second determining unit, configured to determine the third transmit power according to at least a priority of the third channel and the priority of the first channel; and a third determining unit, configured to determine the first power upper limit according to the second threshold and the third transmit power.

With reference to the first possible implementation manner of the third aspect, in a second possible implementation manner of the third aspect, the user equipment further includes a fourth determining unit, where the fourth determining unit is configured to determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; and where the second determining unit is configured to: determine transmit power of the first portion of the third subframe i+1 according to the priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

With reference to the third aspect, in a third possible implementation manner of the third aspect, after the first subframe j and the second subframe i are sent, the first determining unit is further configured to: when the user equipment sends data to the first network side device over a fourth channel and the user equipment sends data to the second network side device over the third channel, determine that the fourth channel separately overlaps the third channel and a fifth channel, where an overlap portion exists between a first portion of a fourth subframe j+1 in which the fourth channel is located and the third subframe i+1; and an overlap portion exists between a second portion, other than the first portion, of the fourth subframe j+1 and a first portion of a fifth subframe i+2 in which the fifth channel is located, where the fifth subframe i+2 is a next subframe of the third subframe i+1, and the fifth subframe i+2 is used to send data to the second network side device. The allocation unit is further configured to allocate, according to a priority of the fourth channel and a priority of the third channel, fourth transmit power to the first portion of the fourth subframe j+1 and the second portion of the fourth subframe j+1, and actual transmit power to the third subframe i+1, where the fourth transmit power is less than or equal to a third power upper limit, and the actual transmit power is less than or equal to a difference between the second threshold and the first power upper limit; a sum of the fourth transmit power and the actual transmit power is less than or equal to a preset fifth threshold; and a sum of fifth transmit power of the fifth subframe i+2 and the third power upper limit is less than or equal to a preset sixth threshold.

With reference to the third aspect, in a fourth possible implementation manner of the third aspect, the user equipment further includes a fourth determining unit, configured to determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device. The user equipment also includes a second determining unit, configured to: determine transmit power of the first portion of the third subframe i+1 according to a priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

With reference to the fourth possible implementation manner of the third aspect, in a fifth possible implementation manner of the third aspect, the user equipment further includes: a fifth determining unit, configured to determine the fourth transmit power according to the priority of the third channel and the priority of the fourth channel; and a sixth determining unit, configured to determine the second power upper limit according to the third threshold and the fourth transmit power.

With reference to the third aspect or any one of the first possible implementation manner of the third aspect to the fifth possible implementation manner of the third aspect, in a sixth possible implementation manner of the third aspect, the user equipment further includes: a seventh determining unit, configured to determine that a current mode of the UE is an asynchronous dual connectivity DC mode.

With reference to the third aspect or any one of the first possible implementation manner of the third aspect to the fifth possible implementation manner of the third aspect, in a seventh possible implementation manner of the third aspect, the user equipment further includes: a receiving unit, configured to receive reference time window information sent by the first network side device or the second network side device, where the reference time window information is used to determine a subframe that needs to be used as a reference during allocation of the first transmit power and the second transmit power.

With reference to the third aspect or any one of the first possible implementation manner of the third aspect to the fifth possible implementation manner of the third aspect, in an eighth possible implementation manner of the third aspect, the user equipment further includes: an eighth determining unit, configured to at least determine that the priority of the third channel is higher than or equal to the priority of the fourth channel.

With reference to the third aspect or any one of the first possible implementation manner of the third aspect to the eighth possible implementation manner of the third aspect, in a ninth possible implementation manner of the third aspect, when the priority of the first channel is higher than the priority of the second channel, the allocation unit is configured to: determine whether required power of the first subframe j is greater than the first power upper limit; when the required power is greater than the first power upper limit, compress the required power to obtain the first transmit power that is less than or equal to the first power upper limit, or determine the first power upper limit as the first transmit power; or when the required power is less than or equal to the first power upper limit, use the required power as the first transmit power; and allocate, to the second subframe i, the second transmit power that is less than or equal to a difference between the first threshold and the first transmit power.

With reference to the third aspect or any one of the first possible implementation manner of the third aspect to the eighth possible implementation manner of the third aspect, in a tenth possible implementation manner of the third aspect, when the priority of the first channel is equal to the priority of the second channel, the allocation unit is configured to: determine first required sub-power of the first subframe j and second required sub-power of the second subframe i, and determine whether a power sum of the first required sub-power and the second required sub-power is greater than the first threshold; and when the power sum is less than or equal to the first threshold, use a smaller value of the first required sub-power and the first power upper limit as the first transmit power, and use the second required sub-power as the second transmit power; or when the power sum is greater than the first threshold, compress the first required sub-power and the second required sub-power in equal proportion, to respectively obtain first compressed required sub-power corresponding to the first required sub-power and second compressed required sub-power corresponding to the second required sub-power, where a sum of the first compressed required sub-power and the second compressed required sub-power is less than or equal to the first threshold; and use a smaller value of the first compressed required sub-power and the first power upper limit as the first transmit power, and allocate, to the second subframe i, the second transmit power that is less than or equal to a difference between the first threshold and the first transmit power.

With reference to the third aspect or any one of the first possible implementation manner of the third aspect to the eighth possible implementation manner of the third aspect, in an eleventh possible implementation manner of the third aspect, the second transmit power is less than or equal to a difference between a fourth threshold and the third power upper limit of a subframe j−1, where the subframe j−1 is a previous subframe of the first subframe j, and the subframe j−1 is used to send data to the first network side device.

With reference to the third aspect or any one of the first possible implementation manner of the third aspect to the eleventh possible implementation manner of the third aspect, in a twelfth possible implementation manner of the third aspect, the user equipment further includes: a ninth determining unit, configured to determine that the first network side device is a secondary network side device SeNB; and determine that the second network side device is a master network side device MeNB.

A fourth aspect of this disclosure provides user equipment, including: a memory, configured to store an instruction; and a processor, coupled to the memory, where the processor runs the stored instruction to perform the following steps. When the user equipment sends data to a first network side device over a first channel and the user equipment sends data to a second network side device over a second channel, determining that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device; and allocating, according to a priority of the first channel and a priority of the second channel, first transmit power to the first portion of the first subframe j and the second portion of the first subframe j, and second transmit power to the second subframe i, where the first transmit power is less than or equal to a first power upper limit, a sum of the first transmit power and the second transmit power is less than or equal to a preset first threshold, and a sum of third transmit power of the third subframe i+1 and the first power upper limit is less than or equal to a preset second threshold.

With reference to the fourth aspect, in a first possible implementation manner of the fourth aspect, the processor is further configured to: before the allocating, according to a priority of the first channel and a priority of the second channel, first transmit power to the first portion of the first subframe j and the second portion of the first subframe j, and second transmit power to the second subframe i, determine the third transmit power according to at least a priority of the third channel and the priority of the first channel; and determine the first power upper limit according to the second threshold and the third transmit power.

With reference to the first possible implementation manner of the fourth aspect, in a second possible implementation manner of the fourth aspect, the processor is configured to: before the determining the third transmit power according to at least a priority of the third channel and the priority of the first channel, determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; determine transmit power of the first portion of the third subframe i+1 according to the priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

With reference to the fourth aspect, in a third possible implementation manner of the fourth aspect, after the first subframe j and the second subframe i are sent, the processor is configured to: when the user equipment sends data to the first network side device over a fourth channel and the user equipment sends data to the second network side device over the third channel, determine that the fourth channel separately overlaps the third channel and a fifth channel, where an overlap portion exists between a first portion of a fourth subframe j+1 in which the fourth channel is located and the third subframe i+1; and an overlap portion exists between a second portion, other than the first portion, of the fourth subframe j+1 and a first portion of a fifth subframe i+2 in which the fifth channel is located, where the fifth subframe i+2 is a next subframe of the third subframe i+1, and the fifth subframe i+2 is used to send data to the second network side device; and allocate, according to a priority of the fourth channel and a priority of the third channel, fourth transmit power to the first portion of the fourth subframe j+1 and the second portion of the fourth subframe j+1, and actual transmit power to the third subframe i+1, where the fourth transmit power is less than or equal to a third power upper limit, and the actual transmit power is less than or equal to a difference between the second threshold and the first power upper limit; a sum of the fourth transmit power and the actual transmit power is less than or equal to a preset fifth threshold; and a sum of fifth transmit power of the fifth subframe i+2 and the third power upper limit is less than or equal to a preset sixth threshold.

With reference to the fourth aspect, in a fourth possible implementation manner of the fourth aspect, the processor is further configured to: before the allocating, according to a priority of the first channel and a priority of the second channel, first transmit power to the first portion of the first subframe j and the second portion of the first subframe j, and second transmit power to the second subframe i, determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; determine transmit power of the first portion of the third subframe i+1 according to a priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

With reference to the fourth possible implementation manner of the fourth aspect, in a fifth possible implementation manner of the fourth aspect, the processor is further configured to: before the determining the third transmit power according to the transmit power of the first portion of the third subframe i+1 and the transmit power of the second portion of the third subframe i+1, determine the fourth transmit power according to the priority of the third channel and the priority of the fourth channel; and determine the second power upper limit according to the third threshold and the fourth transmit power.

With reference to the fourth aspect or any one of the first possible implementation manner of the fourth aspect to the fifth possible implementation manner of the fourth aspect, in a sixth possible implementation manner of the fourth aspect, the processor is further configured to: before the allocating first transmit power to the first portion of the first subframe j and the second portion of the first subframe j, and second transmit power to the second subframe i, determine that a current mode of the UE is an asynchronous dual connectivity DC mode.

With reference to the fourth aspect or any one of the first possible implementation manner of the fourth aspect to the fifth possible implementation manner of the fourth aspect, in a seventh possible implementation manner of the fourth aspect, the user equipment further includes: a receiver, configured to: before the UE allocates the first transmit power to the first portion and the second portion, other than the first portion, of the first subframe j, and the second transmit power to the second subframe i of the second channel, receive reference time window information sent by the first network side device or the second network side device, where the reference time window information is used to determine a subframe that needs to be used as a reference during allocation of the first transmit power and the second transmit power.

With reference to the fourth aspect or any one of the first possible implementation manner of the fourth aspect to the fifth possible implementation manner of the fourth aspect, in an eighth possible implementation manner of the fourth aspect, the processor is further configured to: before the UE allocates the first transmit power to the first portion and the second portion, other than the first portion, of the first subframe j, and the second transmit power to the second subframe i of the second channel, at least determine that the priority of the third channel is higher than or equal to the priority of the fourth channel.

With reference to the fourth aspect or any one of the first possible implementation manner of the fourth aspect to the eighth possible implementation manner of the fourth aspect, in a ninth possible implementation manner of the fourth aspect, the processor is configured to: determine whether required power of the first subframe j is greater than the first power upper limit; when the required power is greater than the first power upper limit, compress the required power to obtain the first transmit power that is less than or equal to the first power upper limit, or determine the first power upper limit as the first transmit power; or when the required power is less than or equal to the first power upper limit, use the required power as the first transmit power; and allocate, to the second subframe i, the second transmit power that is less than or equal to a difference between the first threshold and the first transmit power.

With reference to the fourth aspect or any one of the first possible implementation manner of the fourth aspect to the eighth possible implementation manner of the fourth aspect, in a tenth possible implementation manner of the fourth aspect, the processor is configured to: determine first required sub-power of the first subframe j and second required sub-power of the second subframe i, and determine whether a power sum of the first required sub-power and the second required sub-power is greater than the first threshold; and when the power sum is less than or equal to the first threshold, use a smaller value of the first required sub-power and the first power upper limit as the first transmit power, and use the second required sub-power as the second transmit power; or when the power sum is greater than the first threshold, compress the first required sub-power and the second required sub-power in equal proportion, to respectively obtain first compressed required sub-power corresponding to the first required sub-power and second compressed required sub-power corresponding to the second required sub-power, where a sum of the first compressed required sub-power and the second compressed required sub-power is less than or equal to the first threshold; and use a smaller value of the first compressed required sub-power and the first power upper limit as the first transmit power, and allocate, to the second subframe i, the second transmit power that is less than or equal to a difference between the first threshold and the first transmit power.

With reference to the fourth aspect or any one of the first possible implementation manner of the fourth aspect to the eighth possible implementation manner of the fourth aspect, in an eleventh possible implementation manner of the fourth aspect, the second transmit power is less than or equal to a difference between a fourth threshold and the third power upper limit of a subframe j−1, where the subframe j−1 is a previous subframe of the first subframe j, and the subframe j−1 is used to send data to the first network side device.

With reference to the fourth aspect or any one of the first possible implementation manner of the fourth aspect to the eleventh possible implementation manner of the fourth aspect, in a twelfth possible implementation manner of the fourth aspect, the first network side device is a secondary network side device SeNB; and it is determined that the second network side device is a master network side device MeNB.

A fifth aspect of this disclosure provides a base station, including: a sending unit, configured to send reference time window information to user equipment UE, where the reference time window information is used to indicate, to the UE, a subframe that needs to be used as a reference during allocation of first transmit power to a first subframe j in which a first channel is located and second transmit power to a second subframe i in which a second channel is located; and a receiving unit, configured to receive data on the first channel sent by the UE at the first transmit power or data on the second channel sent by the UE at the second manner power.

A sixth aspect of this disclosure provides a base station, including: a transmitter, configured to send reference time window information to user equipment UE, where the reference time window information is used to indicate, to the UE, a subframe that needs to be used as a reference during allocation of first transmit power to a first subframe j in which a first channel is located and second transmit power to a second subframe i in which a second channel is located; and a receiver, configured to receive data on the first channel sent by the UE at the first transmit power or data on the second channel sent by the UE at the second manner power.

One or more technical solutions provided in the embodiments have at least the following technical effects or advantages.

According to a power configuration method in an embodiment, when user equipment UE sends data to a first network side device over a first channel and the UE sends data to a second network side device over a second channel, it is determined that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device; and according to a priority of the first channel and a priority of the second channel, first transmit power is allocated to the first portion of the first subframe j and the second portion of the first subframe j, and second transmit power is allocated to the second subframe i, where the first transmit power is less than or equal to a first power upper limit, a sum of the first transmit power and the second transmit power is less than or equal to a preset first threshold, and a sum of transmit power of the first portion of the third subframe i+1 and the first power upper limit is less than or equal to a preset second threshold. Therefore, in this embodiment, not only the priorities of the first channel and the second channel but also an upper limit of the first transmit power is considered during allocation of the first transmit power, and the first power upper limit is related to the transmit power of the first portion of the third subframe i+1. In other words, in this embodiment, the first power upper limit is set for the first transmit power with reference to transmit power required for the third subframe i+1, instead of considering only a requirement of a current transmit subframe, so that a requirement of a subframe to be subsequently sent is ensured. Therefore, power configured by using the power configuration method in this embodiment is more proper, ensuring that power is properly allocated to important information.

DETAILED DESCRIPTION OF ILLUSTRATIVE EMBODIMENTS

Figure 1:
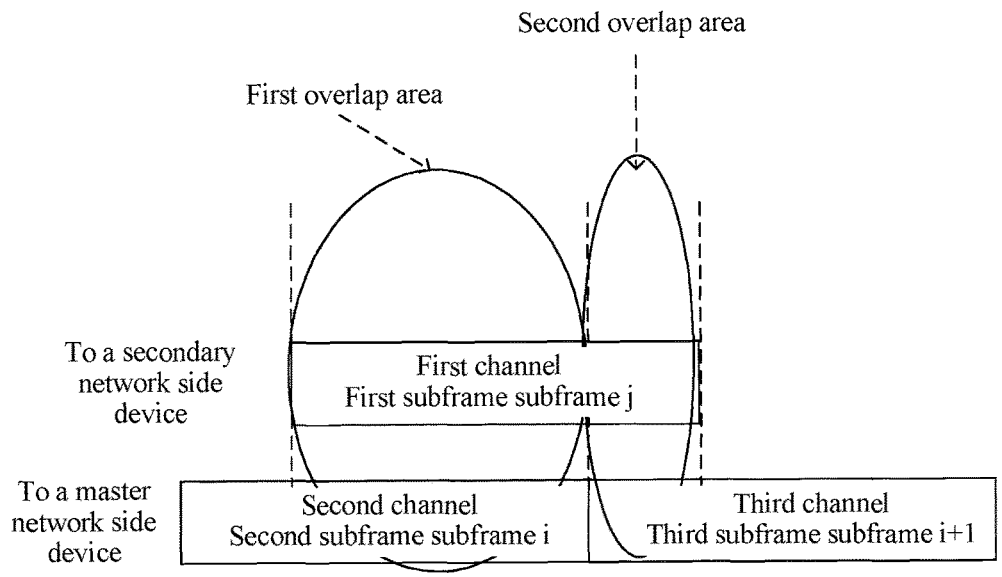
FIG. 1 is a schematic diagram of power configuration in the prior art.

Embodiments provide a power configuration method, user equipment, and a base station, so as to resolve a technical problem existing in the prior art that because of improper power allocation when user equipment sends data over multiple channels, power allocation to important information cannot be ensured.

To resolve the foregoing technical problem, a general idea of technical solutions in the embodiments is as follows.

According to a power configuration method in an embodiment, when user equipment UE sends data to a first network side device over a first channel and the UE sends data to a second network side device over a second channel, it is determined that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device; and according to a priority of the first channel and a priority of the second channel, first transmit power is allocated to the first portion of the first subframe j and the second portion of the first subframe j, and second transmit power is allocated to the second subframe i, where the first transmit power is less than or equal to a first power upper limit, a sum of the first transmit power and the second transmit power is less than or equal to a preset first threshold, and a sum of transmit power of the first portion of the third subframe i+1 and the first power upper limit is less than or equal to a preset second threshold. Therefore, in this embodiment, not only the priorities of the first channel and the second channel but also an upper limit of the first transmit power is considered during allocation of the first transmit power, and the first power upper limit is related to the transmit power of the first portion of the third subframe i+1. In other words, in this embodiment, the first power upper limit is set for the first transmit power with reference to transmit power required for the third subframe i+1, instead of considering only a requirement of a current transmit subframe, so that a requirement of a subframe to be subsequently sent is ensured. Therefore, power configured by using the power configuration method in this embodiment is more proper, ensuring that power is properly allocated to important information.

To make the objectives, technical solutions, and advantages of the embodiments clearer, the following clearly describes the technical solutions in the embodiments with reference to the accompanying drawings in the embodiments. Apparently, the described embodiments are merely a part rather than all of the embodiments. All other embodiments obtained by a person of ordinary skill in the art according to the embodiments without creative efforts shall fall within the protection scope of this disclosure.

This specification describes various aspects with reference to user equipment and/or a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless telephone set, a Session Initiation Protocol (SIP) phone, a wireless local loop (WLL) station, a personal digital assistant (PDA), or a meter having a function of automatically reading water/electricity/gas. The wireless terminal may also be called a system, a subscriber unit, a subscriber station, a mobile station, a mobile station, a remote station, an access point, a remote terminal, an access terminal, a user terminal, a user agent, a user device, or user equipment.

The base station (for example, an access point) may refer to a device in communication with a wireless terminal via one or more sectors at an air interface in an access network. The base station may be configured to perform conversion between a received over-the-air frame and an IP packet, and serve as a router between the wireless terminal and a rest portion of the access network, where the rest portion of the access network may include an internet protocol (IP) network. The base station may also coordinate attribute management of the air interface. For example, the base station may be a base station (BTS) in GSM, or may be a base station (NodeB) in UTMS, or may be an evolved NodeB (eNodeB) in LTE or LTE-A, which is not limited in this disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes the implementation manners of this disclosure in detail with reference to the accompanying drawings.

Embodiment 1

Figure 2:
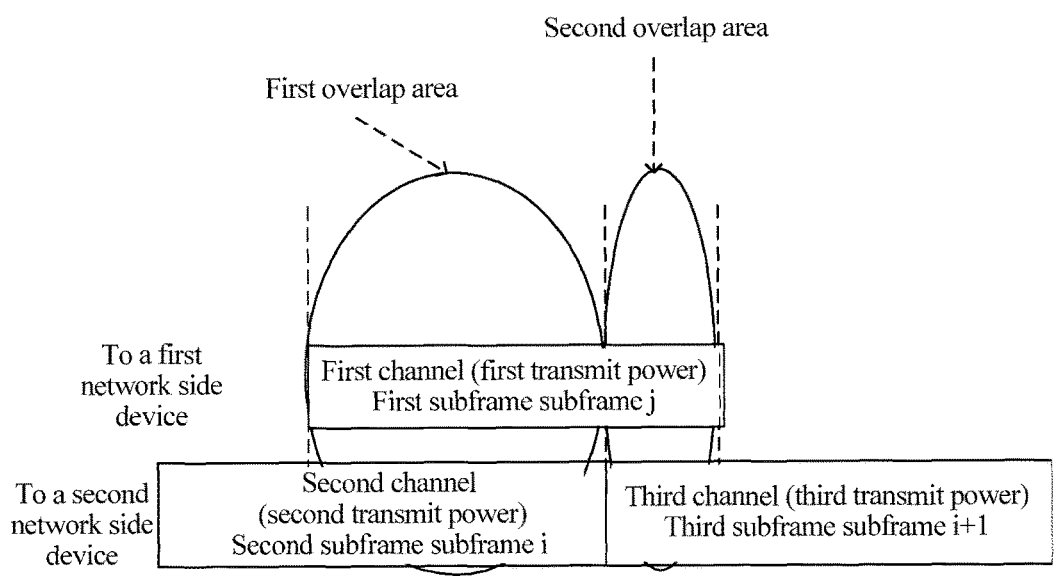
FIG. 2 is a schematic diagram of power configuration according to an embodiment.
Figure 3:
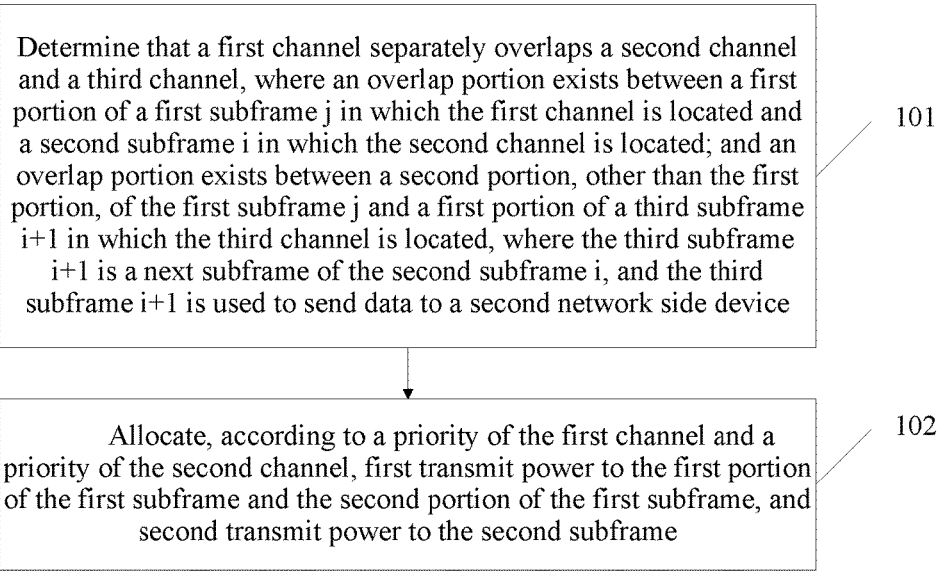
FIG. 3 is a flowchart of a power configuration method according to an embodiment.

When user equipment UE sends data to a first network side device over a first channel and the UE sends data to a second network side device over a second channel, this embodiment provides a power configuration method. Referring to FIG. 2 and FIG. 3, FIG. 2 is a schematic diagram of overlap between channels in the power configuration method in this embodiment, and FIG. 3 is a flowchart of the power configuration method in this embodiment. The method includes the following content:

Step 101: Determine that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device. For ease of description, the overlap portion that exists between the first portion of the first subframe j and the second subframe i is referred to as a first overlap area, and the overlap portion that exists between the second portion, other than the first portion, of the first subframe j and the first portion of the third subframe i+1 is referred to as a second overlap area.

Overlap in this embodiment refers to overlap between channels in terms of time, and for a subframe, may be considered as overlap between symbols.

In a specific implementation process, before the user equipment UE performs step 101, the method further includes: receiving reference time window information sent by the first network side device or the second network side device, where the reference time window information is used to determine a subframe that needs to be used as a reference during allocation of first transmit power and second transmit power.

Figure 4:
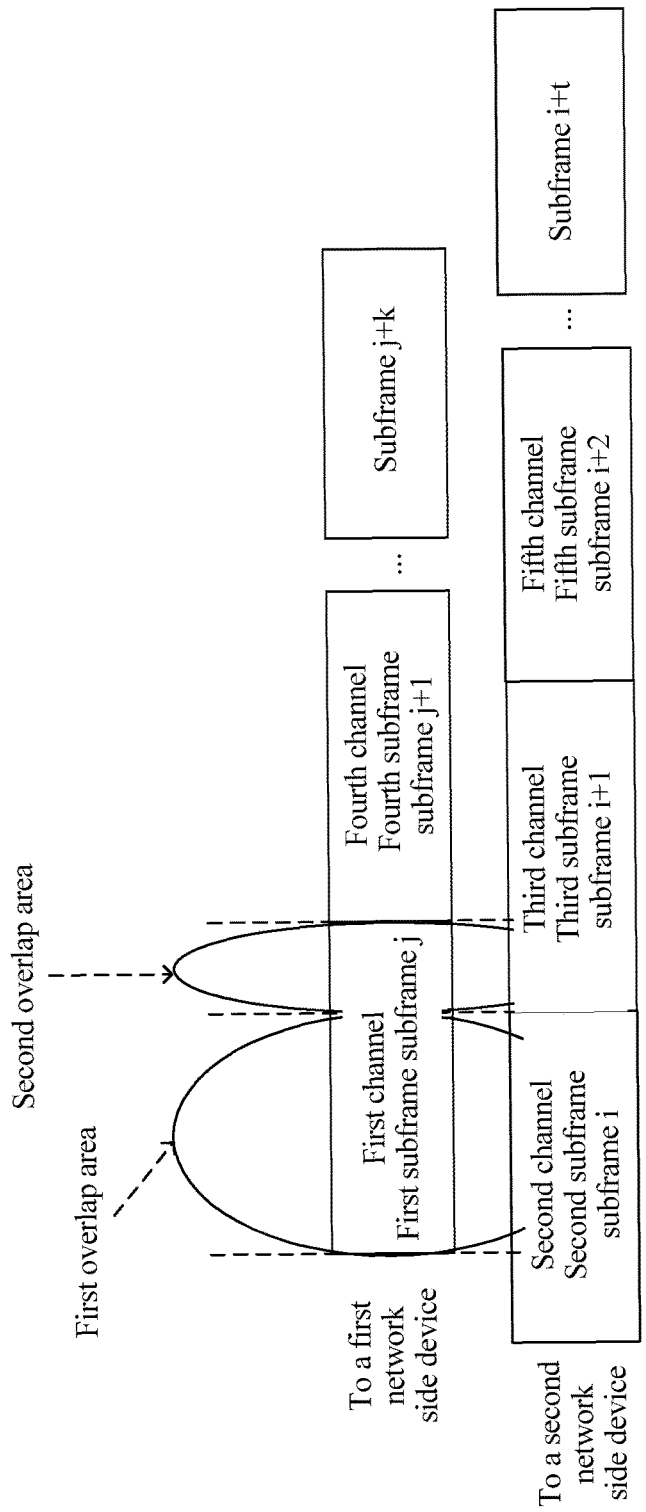
FIG. 4 is a time sequence diagram of channels according to an embodiment.

Specifically, the UE determines indicators k and t according to the received reference time window information. According to k and t, it may be determined that during allocation of the first transmit power and the second transmit power in step 102, as shown in FIG. 4, in addition to the first subframe j and the second subframe i, a subframe j+1 to a subframe j+k and a subframe i+1 to a subframe i+k need to be used as a reference. For example, in this embodiment, t is 1 and k is 0, that is, in the embodiment in FIG. 2, the third subframe i+1 in which the third channel is located needs to be used as a reference. In actual application, values of i and j are integers from 0 to 9 (including 0 and 9), where when j+1 is greater than 9, the subframe j+1 is named a subframe (j+1) mod 10; when i+1 is greater than 9, the subframe i+1 is named a subframe (i+1) mod 10; and when j−1 is less than 0, a subframe j−1 is named a subframe (j−1) mod 10; when i−1 is less than 0, a subframe i−1 is named a subframe (i−1) mod 10, where k is an integer greater than or equal to 0, and t is an integer greater than or equal to 1.

Because of different quantities of subframes that need to be used as a reference, in addition to performing step 101 of determining that the first channel separately overlaps the second channel and the third channel, the UE may further need to determine that the third channel overlaps a fourth channel, and may even need to determine that more uplink channels overlap. A case in which the UE further needs to determine that the third channel overlaps the fourth channel is further described later.

Certainly, in actual application, it may further be that the UE itself determines a subframe that needs to be used as a reference, and further determines a quantity of overlap portions that need to be determined. Alternatively, according to a pre-configuration, the UE only needs to determine that the first channel separately overlaps the second channel and the third channel; or according to a pre-configuration, the UE uses a specified quantity of subframes as a reference.

Specifically, after step 101 and before step 102, the method further includes: at least determining that a priority of the third channel is higher than or equal to a priority of the fourth channel. In this case, after determining that the first channel separately overlaps the second channel and the third channel, the UE determines to use the third channel as a reference. Further, if the priority of the third channel is lower than the priority of the fourth channel, when the UE further determines that the priority of the fourth channel is higher than or equal to a priority of a fifth channel after the UE determines that the third channel overlaps the fourth channel, the UE determines to use the third channel and the fourth channel as a reference. Then, the UE may further compare priorities of subsequent channels, for example, priorities of the fifth channel and a sixth channel, until determining a subframe location in which a priority of a next channel is lower than or equal to a priority of a current channel, that is, a cutoff point of a reference subframe. When a relatively wide range is considered, a reference subframe range may also be limited by using a reference time window.

Priorities of channels may be determined according to factors that include but are not limited to the following: The priorities are differentiated according to a channel type, for example, a priority of a physical random access channel (PRACH) is higher than a priority of a physical uplink control channel (PUCCH), the priority of the PUCCH is higher than a priority of a physical uplink shared channel (PUSCH) that carries uplink control information (UCI), and the priority of the PUSCH that carries the UCI is higher than a priority of a PUSCH that does not carry the UCI. Alternatively, the priorities are differentiated according to importance of carried UCI, for example, a priority of a channel that carries an hybrid automatic repeat request-acknowledgement (HARQ-ACK)/an scheduling request (SR) is higher than a priority of a channel that carries channel state information (CSI). Alternatively, the priorities are differentiated according to a type of a destination network side device, for example, a priority of an uplink channel that is sent to a master network side device is higher than a priority of an uplink channel that is sent to a secondary network side device.

The UE determines that the first channel separately overlaps the second channel and the third channel, which may be determined according to uplink timing of uplink channels that are sent to the first network side device and the second network side device.

Step 102 is performed: Allocate, according to a priority of the first channel and a priority of the second channel, first transmit power to the first portion of the first subframe j and the second portion of the first subframe j, and second transmit power to the second subframe i. Therefore, the first portion of the first subframe j and the second portion of the first subframe j are transmitted at equal power, that is, all SC-OFDMA symbols of the first subframe j are transmitted at same power.

The first transmit power is less than or equal to a first power upper limit, a sum of the first transmit power and the second transmit power is less than or equal to a preset first threshold, and a sum of third transmit power of the third subframe i+1 and the first power upper limit is less than or equal to a preset second threshold.

Generally, both the first threshold and the second threshold may be maximum total transmit power of the UE. However, at moments in different overlap areas, that is, in different time segments, the first threshold and the second threshold may be the same or may be different. In another possible implementation manner, both the first threshold and the second threshold may be other values preset by a user or a system, and therefore may be the same or may be different.

Specifically, step 102 includes: determining, according to the priority of the first channel and the priority of the second channel, which of the first channel and the second channel has a higher priority; and when the priority of the first channel is higher than the priority of the second channel, first allocating the same first transmit power to the first portion of the first subframe j and the second portion of the first subframe j according to the first power upper limit, so that the first transmit power is less than or equal to the first power upper limit, and then allocating the second transmit power to the second subframe i according to the first threshold and the first transmit power, so that a sum of the first transmit power and the second transmit power is less than or equal to the preset first threshold; or when the priority of the second channel is higher than the priority of the first channel, first allocating the second transmit power to the second subframe i, and then allocating the same first transmit power to the first portion of the first subframe j and the second portion of the first subframe j according to the first threshold and the first power upper limit, so that a sum of the first transmit power and the second transmit power is less than or equal to the preset first threshold, and the first transmit power is less than or equal to the first power upper limit.

Further, when the priority of the first channel is higher than the priority of the second channel, the allocating the same first transmit power to the first portion of the first subframe j and the second portion of the first subframe j is: comparing required power of the first subframe j with the first power upper limit, and determining a smaller value as the first transmit power.

In another embodiment, when the priority of the first channel is higher than the priority of the second channel, the allocating the same first transmit power to the first portion of the first subframe j and the second portion of the first subframe j is: determining whether required power of the first subframe j is greater than the first power upper limit; and when the required power is greater than the first power upper limit, compressing the required power to obtain the first transmit power that is less than or equal to the first power upper limit; or when the required power is less than or equal to the first power upper limit, using the required power as the first transmit power. The required power is transmit power required by the UE to send the first subframe j in which the first channel is located, and generally, the required power may be determined according to information such as uplink scheduling information and a power control command of the first subframe j.

In the foregoing two cases, the second transmit power that is less than or equal to a difference between the first threshold and the first transmit power is allocated to the second subframe i.

Further, when the priority of the second channel is higher than the priority of the first channel, the allocating the same first transmit power to the first portion of the first subframe j and the second portion of the first subframe j includes: obtaining a difference between the first threshold and the second transmit power; comparing the difference with the first power upper limit; and determining a smallest value of the difference, the first power upper limit, and the required power of the first subframe j as the first transmit power. In another possible implementation manner, the allocating the same first transmit power to the first portion of the first subframe j and the second portion of the first subframe j according to the first threshold and the first power upper limit includes: obtaining a difference between the first threshold and the second transmit power; comparing the difference, the first power upper limit, and the required power of the first subframe j with each other; and when the difference is less than or equal to the first power upper limit and less than or equal to the required power of the first subframe j, determining the difference as the first transmit power; or when the first power upper limit is less than or equal to the difference and less than or equal to the required power of the first subframe j, determining the first power upper limit as the first transmit power; or when the required power of the first subframe j is less than or equal to the first power upper limit and less than or equal to the difference, determining the required power of the first subframe j as the first transmit power.

Further, when the priority of the first channel is equal to the priority of the second channel, step 102 includes: determining first required sub-power of the first subframe j and second required sub-power of the second subframe i, and determining whether a power sum of the first required sub-power and the second required sub-power is greater than the first threshold; and when the power sum is less than or equal to the first threshold, using a smaller value of the first required sub-power and the first power upper limit as the first transmit power, and using the second required sub-power as the second transmit power; or when the power sum is greater than the first threshold, compressing the first required sub-power and the second required sub-power in equal proportion, to respectively obtain first compressed required sub-power corresponding to the first required sub-power and second compressed required sub-power corresponding to the second required sub-power, where a sum of the first compressed required sub-power and the second compressed required sub-power is less than or equal to the first threshold; and using a smaller value of the first compressed required sub-power and the first power upper limit as the first transmit power, and allocating, to the second subframe i, the second transmit power that is less than or equal to a difference between the first threshold and the first transmit power. The first required sub-power is transmit power required by the UE to send the first subframe j in which the first channel is located, and generally, the first required sub-power may be determined according to information such as uplink scheduling information and a power control command of the first subframe j; the second required sub-power is transmit power required by the UE to send the second subframe i in which the second channel is located, and generally, the second required sub-power may be similarly determined according to information such as uplink scheduling information and a power control command of the second subframe i.

In another possible implementation manner, when the power sum is less than or equal to the first threshold, if the first required sub-power is greater than the first power upper limit, power compression is performed on the first required sub-power, and compressed power that is less than or equal to the first power upper limit is obtained and used as the first transmit power; or when the power sum is greater than the first threshold, if the first compressed required sub-power is greater than the first power upper limit, the first compressed required sub-power is further compressed to obtain recompressed power that is less than or equal to the first power upper limit, and then the recompressed power is used as the first transmit power.

The following describes the first power upper limit. In this embodiment, the sum of the third transmit power of the third subframe i+1 and the first power upper limit is less than or equal to the preset second threshold. In other words, the first power upper limit depends on the second threshold and the third transmit power of the third subframe i+1. As described above, the second threshold is generally the maximum total transmit power of the UE or the another preset value in the second overlap area. Generally, after being set, the second threshold is a fixed value within a corresponding time segment, and therefore a final value of the first power upper limit depends on the third transmit power. It should be noted that the third transmit power is pre-transmit power of the third subframe i+1, where the pre-transmit power may be an actual power requirement of the third subframe i+1, or may be a virtual power requirement of the third subframe i+1. Therefore, in this embodiment, a pre-transmit power requirement of a subframe to be subsequently sent, that is, the third subframe i+1, needs to be considered during allocation of power of subframes to be currently sent, that is, the first subframe j and the second subframe i. In other words, both power requirements of the subframes to be currently sent and the pre-transmit power requirement of the subframe to be subsequently sent need to be considered comprehensively. Therefore, power configured by using the power configuration method in this embodiment is more proper, ensuring accuracy of important data sent by the UE after the current subframes, and lowering an error rate in receiving the important data sent by the UE.

The following describes how to determine the first power upper limit. Before step 102, the method further includes: determining the third transmit power according to at least the priority of the third channel and the priority of the first channel; and determining the first power upper limit according to the second threshold and the third transmit power.

When the priority of the third channel is higher than the priority of the first channel, the third transmit power of the third subframe i+1 is preferentially determined, and then a difference between the second threshold and the third transmit power or a value less than the difference may be the first transmit power.

When the priority of the third channel is equal to the priority of the first channel, both the third transmit power and a first pre-transmit power of the first subframe j are determined, and whether a power sum of the third transmit power and the first pre-transmit power is greater than the second threshold is determined; and when the power sum is less than or equal to the second threshold, a difference between the second threshold and the third transmit power or a value less than the difference may be the first power upper limit; or when the power sum is greater than the second threshold, the third transmit power and the first pre-transmit power are compressed in equal proportion until a power sum obtained after compression is less than or equal to the second threshold, to respectively obtain a compressed third transmit power corresponding to the third transmit power and a compressed first pre-transmit power corresponding to the first pre-transmit power, and then the compressed first pre-transmit power is the first power upper limit.

When the priority of the third channel is lower than the priority of the first channel, the first pre-transmit power of the first subframe j is preferentially determined, and then a difference between the second threshold and the first pre-transmit power or a value less than the difference is determined as the third transmit power, while the first pre-transmit power may be the first power upper limit.

Preferably, when only the transmit power of the third subframe i+1 in which the third channel is located is considered, the third transmit power may be determined by considering only the priority of the third channel and the priority of the first channel, which includes: determining transmit power of a first portion of the third subframe i+1 according to the priority of the third channel and the priority of the first channel. Because other subsequent subframes are not considered, and all portions of one subframe need to be sent at equal power, that is, all SC-FDMA symbols of one subframe need to be sent at equal power, the transmit power of the first portion of the third subframe i+1 is the third transmit power. All the SC-FDMA symbols of one subframe need to be sent at equal power, which helps a network side device to perform demodulation of high-order 16QAM-modulated data that is sent.

Figure 5:
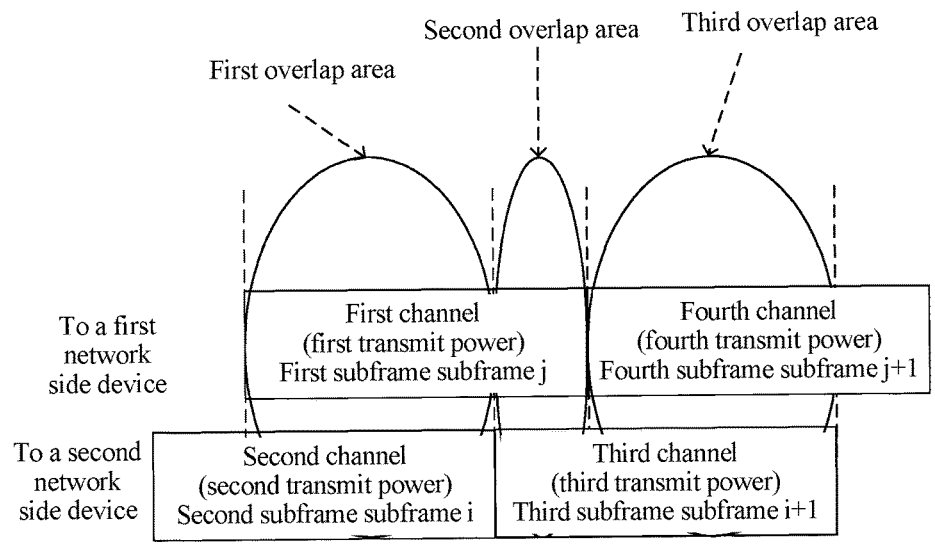
FIG. 5 is a schematic diagram of power configuration according to another embodiment.

When the fourth channel is also considered, that is, values of k and t are 1, referring also to FIG. 5, before the determining the third transmit power according to at least the priority of the third channel and the priority of the first channel, the method further includes: determining that the third channel overlaps the fourth channel, where an overlap portion exists between a second portion, other than the first portion of the third subframe i+1, of the third subframe i+1 and a first portion of a fourth subframe j+1 in which the fourth channel is located, and for ease of description, is referred to as a third overlap area, the fourth subframe j+1 is a next subframe of the first subframe j, and the fourth subframe j+1 is used to send data to the first network side device.

Therefore, in this case, the determining the third transmit power according to at least the priority of the third channel and the priority of the first channel includes: determining transmit power of the first portion of the third subframe i+1 according to the priority of the third channel and the priority of the first channel; determining transmit power of the second portion of the third subframe i+1 according to the priority of the third channel and the priority of the fourth channel; and determining the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

Specifically, the determining transmit power of the first portion of the third subframe i+1 according to the priority of the third channel and the priority of the first channel, and determining transmit power of the second portion of the third subframe i+1 according to the priority of the third channel and the priority of the fourth channel is similar to the foregoing process of determining transmit power according to a channel priority, and details are not described herein again. The third transmit power is determined according to the transmit power of the first portion of the third subframe i+1 and the transmit power of the second portion of the third subframe i+1. For example, a smallest value of the transmit power of the first portion of the third subframe i+1, the transmit power of the second portion of the third subframe i+1, and the second power upper limit is used as the third transmit power; or when a smaller value of the transmit power of the first portion of the third subframe i+1 and the transmit power of the second portion of the third subframe i+1 is still greater than the second power upper limit, power compression may be performed on the smaller value, so that compressed power is less than or equal to the second power upper limit.

The sum of the second power upper limit and the fourth transmit power of the fourth subframe j+1 is less than or equal to the preset third threshold, where the third threshold is generally maximum total transmit power of the UE in the third overlap area, or may be another value configured by a system or set by a user, and therefore may be the same as or different from the first threshold and the second threshold.

In another embodiment in which the fourth channel is considered, before step 102, the method further includes: determining that the third channel overlaps the fourth channel, where an overlap portion exists between a second portion, other than the first portion of the third subframe i+1, of the third subframe i+1 and a first portion of a fourth subframe j+1 in which the fourth channel is located, and for ease of description, is referred to as a third overlap area, the fourth subframe j+1 is a next subframe of the first subframe j, and the fourth subframe j+1 is used to send data to the first network side device; determining transmit power of the first portion of the third subframe i+1 according to the priority of the third channel and the priority of the first channel; determining transmit power of the second portion of the third subframe i+1 according to the priority of the third channel and the priority of the fourth channel; and determining the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

Further, before the determining the third transmit power according to the transmit power of the first portion of the third subframe i+1 and the transmit power of the second portion of the third subframe i+1, the method further includes: determining the fourth transmit power according to the priority of the third channel and the priority of the fourth channel; and determining the second power upper limit according to the third threshold and the fourth transmit power.

In this embodiment, for a specific implementation manner, reference may be made to a description in the previous embodiment in which the fourth channel is considered, and details are not described herein again.

It should be noted that in the foregoing embodiments, the determined third transmit power is pre-transmit power of the third subframe i+1; when the user equipment UE sends data to the first network side device over the fourth channel in the fourth subframe j+1 and the UE sends data to the second network side device over the third channel in the third subframe i+1, actual transmit power allocated to the third subframe i+1 does not exceed the pre-transmit power of the third subframe i+1, that is, the actual transmit power is less than or equal to a difference between the second threshold and the first power upper limit.

Figure 6:
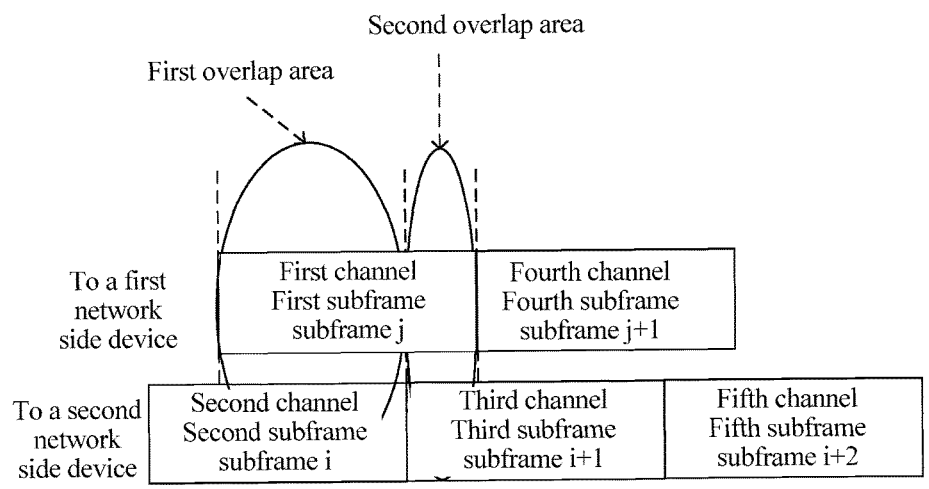
FIG. 6 is a schematic diagram of power configuration according to still another embodiment.

Specifically, after the UE sends the first subframe j and the second subframe i, referring to FIG. 6, the method further includes: when the UE sends data to the first network side device over a fourth channel and the UE sends data to the second network side device over the third channel, determining that the fourth channel separately overlaps the third channel and a fifth channel, where an overlap portion exists between a first portion of a fourth subframe j+1 in which the fourth channel is located and the third subframe i+1; and an overlap portion exists between a second portion, other than the first portion, of the fourth subframe j+1 and a first portion of a fifth subframe i+2 in which the fifth channel is located, where the fifth subframe i+2 is a next subframe of the third subframe i+1, and the fifth subframe i+2 is used to send data to the second network side device; and allocating fourth transmit power to the first portion of the fourth subframe j+1 and the second portion of the fourth subframe j+1, and allocating actual transmit power to the third subframe i+1 according to a priority of the fourth channel and a priority of the third channel, where the fourth transmit power is less than or equal to a third power upper limit, and the actual transmit power is less than or equal to a difference between the second threshold and the first power upper limit; a sum of the fourth transmit power and the actual transmit power is less than or equal to a preset fifth threshold; and a sum of fifth transmit power of the fifth subframe i+2 and the third power upper limit is less than or equal to a preset sixth threshold. Meanings of the fifth threshold and the sixth threshold are the same as those of the first threshold and the second threshold. It should be noted that specific values of the first threshold, the second threshold, the third threshold, a fourth threshold, the fifth threshold, and the sixth threshold may be the same or different.

Similarly, when a subframe j−1 and a subframe i−1 prior to the first subframe j and the second subframe i are being sent, the second subframe i is used as a reference, or both the first subframe j and the second subframe i are used as a reference; then, during allocation of the second transmit power in step 102, it is also required to ensure that the second transmit power is less than or equal to a difference between a fourth threshold and the third power upper limit of the subframe j−1, where the subframe j−1 is a previous subframe of the first subframe j, and the subframe j−1 is used to send data to the first network side device; and the subframe i−1 is a previous subframe of the second subframe i, and the subframe i−1 is used to send data to the second network side device. The fourth threshold is generally maximum total transmit power of the UE in an overlap area between the subframe j−1 and the subframe i, or may be another value configured by a system or set by a user, and therefore may be the same as or different from the first threshold, the second threshold, and the third threshold.

Optionally, the second channel and the third channel belong to a master cell group MCG or a primary carrier group; and/or the first channel and the fourth channel belong to a secondary cell group SCG or a secondary carrier group.

Therefore, in this embodiment, the third transmit power upper limit is limited by the fourth transmit power, and further, the third power limits the first transmit power upper limit. That is, during allocation of the first transmit power, power requirements of both the third subframe i+1 and the fourth subframe j+1 are considered, so that power configuration is more proper. Likewise, a power requirement of the fifth subframe i+2 may be considered for an upper limit of the fourth transmit power, where the fifth subframe i+2 is a next subframe of the third subframe i+1, and the fifth subframe i+2 is used to send data to the second network side device. By analogy, power requirements of multiple subsequent subframes may be considered comprehensively, where the UE may determine a specific quantity of the subsequent subframes according to k and t described above, and then performs power configuration. For brevity of the specification, details are not described herein again.

Optionally, before step 102, the method further includes: determining that a current mode of the UE is a dual connectivity (DC) mode and the two network side devices are downlink asynchronous, that is, there is a time difference between start moments of downlink subframe transmission of the two network side devices, that is, an asynchronous dual connectivity DC mode. Generally, in this scenario, uplink channels are prone to overlap each other, and therefore the power configuration method described in the foregoing embodiment is used for power configuration.

Optionally, after the power configuration is complete, the method further includes: sending, by the UE, data to the first network side device and the second network side device respectively at the first transmit power and the second transmit power, where the sent data includes but is not limited to uplink control information and user data.

Optionally, before step 102, the method further includes: determining that the first network side device is a secondary network side device SeNB, and determining that the second network side device is a master network side device MeNB.

It should be noted that in the foregoing embodiments, there are two execution actions: allocating transmit power and determining transmit power, where in allocating transmit power to a subframe, the transmit power is actual transmit power; in determining transmit power of a subframe, the transmit power may be actual or virtual. However, the actual transmit power allocated to the subframe is less than or equal to the transmit power of the subframe.

The following uses several specific examples to describe an implementation process of the power configuration method in this embodiment.

A first implementation manner: in this implementation manner, referring to FIG. 2, an example of allocating power to a first subframe j and a second subframe i is used for description, where only a power requirement of a third subframe i+1 is used as a reference.

First, UE determines, by using step 101, that a first channel separately overlaps a second channel and a third channel.

Second, the UE determines transmit power of a first portion of the third subframe i+1 according to a priority of the first channel and a priority of the third channel. Because only the third subframe i+1 is considered, the transmit power of the first portion of the third subframe i+1 may be sufficiently used as third transmit power of the third subframe i+1.

Third, the UE determines a first power upper limit according to the third transmit power and a second threshold, where a sum of the third transmit power and the first power upper limit is less than or equal to the second threshold.

Then, the UE performs step 102 of allocating first transmit power and second transmit power respectively to the first subframe j and the second subframe i according to the priority of the first channel, a priority of the second channel, and the first power upper limit, so that the first transmit power is less than or equal to the first power upper limit, and a sum of the first transmit power and the second transmit power is less than or equal to a first threshold. For a specific allocation manner, refer to the foregoing description.

A second implementation manner: in this implementation manner, referring to FIG. 6, after sending a first subframe j and a second subframe i, UE is going to send a third subframe i+1 and a fourth frame j+1, where a subframe that needs to be used as a reference is a fifth subframe i+2 in which a fifth channel is located. In this case, a process of allocating power to the third subframe i+1 and the fourth subframe j+1 is basically the same as a process of allocating power to the second subframe i and the first subframe j in the first implementation manner, and a same part is not described herein again. What is different is that in the process of allocating the power to the second subframe i and the first subframe j, third transmit power is determined for the third subframe i+1, where the third transmit power is pre-transmit power of the third subframe i+1; therefore, when actual transmit power is allocated to the third subframe i+1, the pre-transmit power of the third subframe i+1 further needs to be used as a reference, where the actual transmit power is less than or equal to the pre-transmit power, that is, less than or equal to a difference between a second threshold and a first power upper limit.

A third implementation manner: in this implementation manner, referring to FIG. 5, an example of allocating power to a first subframe j and a second subframe i is used for description, where power requirements of a third subframe i+1 and a fourth subframe j+1 are used as a reference.

First, UE determines, by using step 101, that a first channel separately overlaps a second channel and a third channel, and further determines that the third channel overlaps a fourth channel.

Second, the UE determines transmit power of a first portion of the third subframe i+1 according to a priority of the first channel and a priority of the third channel; determines transmit power of a second portion of the third subframe i+1 according to a priority of the third channel and a priority of the fourth channel; determines fourth transmit power of the fourth subframe j+1 according to the priority of the third channel and the priority of the fourth channel; determines a second power upper limit according to a third threshold and the fourth transmit power, where a sum of the second power upper limit and the fourth transmit power is less than or equal to a preset third threshold; and determines third transmit power according to the transmit power of the first portion of the third subframe i+1 and the transmit power of the second portion of the third subframe i+1, where the third transmit power is less than or equal to the second power upper limit.

Third, the UE determines a first power upper limit according to the third transmit power and a second threshold, where a sum of the third transmit power and the first power upper limit is less than or equal to the second threshold.

Then, the UE performs step 102 of allocating first transmit power and second transmit power respectively to the first subframe j and the second subframe i according to the priority of the first channel and a priority of the second channel, so that the first transmit power is less than or equal to the first power upper limit, and a sum of the first transmit power and the second transmit power is less than or equal to a first threshold. For a specific allocation manner, refer to the foregoing description.

A process of the method shown in FIG. 3 is described from a user equipment UE side. Based on a same inventive concept, a first network side device and/or a second network side device can perform the following steps: sending reference time window information to user equipment UE, where the reference time window information is used to indicate, to the UE, a subframe that needs to be used as a reference during allocation of first transmit power to a first subframe j in which a first channel is located and second transmit power to a second subframe i in which a second channel is located; and receiving data that is sent by the UE at the first transmit power or at the second manner power.

How to determine information about overlap between at least two channels after the UE receives the reference time window information, and how to allocate the first transmit power and the second transmit power by means of another subframe have been described in detail in the foregoing implementation process of the UE, and details are not described herein again.

Embodiment 2

Figure 7:
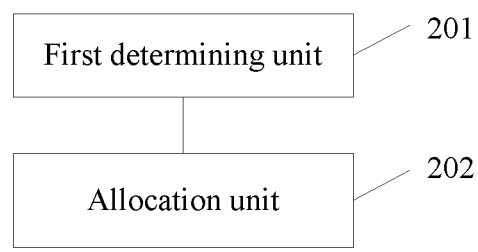
FIG. 7 is a functional block diagram of user equipment according to an embodiment.

An embodiment further provides user equipment. Referring to FIG. 7, the user equipment includes: a first determining unit 201, configured to: when the user equipment sends data to a first network side device over a first channel and the user equipment sends data to a second network side device over a second channel, determine that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device; and an allocation unit 202, configured to: allocate, according to a priority of the first channel and a priority of the second channel, first transmit power to the first portion of the first subframe j and the second portion of the first subframe j, and second transmit power to the second subframe i, where the first transmit power is less than or equal to a first power upper limit, a sum of the first transmit power and the second transmit power is less than or equal to a preset first threshold, and a sum of third transmit power of the third subframe i+1 and the first power upper limit is less than or equal to a preset second threshold.

Optionally, the user equipment further includes: a second determining unit, configured to determine the third transmit power according to at least a priority of the third channel and the priority of the first channel; and a third determining unit, configured to determine the first power upper limit according to the second threshold and the third transmit power.

Further, the user equipment further includes a fourth determining unit, where the fourth determining unit is configured to determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; and the second determining unit is configured to: determine transmit power of the first portion of the third subframe i+1 according to the priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

Optionally, after the first subframe j and the second subframe i are sent, the first determining unit 201 is further configured to: when the user equipment sends data to the first network side device over a fourth channel and the user equipment sends data to the second network side device over the third channel, determine that the fourth channel separately overlaps the third channel and a fifth channel, where an overlap portion exists between a first portion of a fourth subframe j+1 in which the fourth channel is located and the third subframe i+1; and an overlap portion exists between a second portion, other than the first portion, of the fourth subframe j+1 and a first portion of a fifth subframe i+2 in which the fifth channel is located, where the fifth subframe i+2 is a next subframe of the third subframe i+1, and the fifth subframe i+2 is used to send data to the second network side device; and the allocation unit 202 is further configured to allocate, according to a priority of the fourth channel and a priority of the third channel, fourth transmit power to the first portion of the fourth subframe j+1 and the second portion of the fourth subframe j+1, and actual transmit power to the third subframe i+1, where the fourth transmit power is less than or equal to a third power upper limit, and the actual transmit power is less than or equal to a difference between the second threshold and the first power upper limit; a sum of the fourth transmit power and the actual transmit power is less than or equal to a preset fifth threshold; and a sum of fifth transmit power of the fifth subframe i+2 and the third power upper limit is less than or equal to a preset sixth threshold.

Optionally, the user equipment further includes a fourth determining unit, configured to determine that the third channel overlaps a fourth channel, where an overlap portion exists between a second portion, other than the first portion, of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; and a second determining unit, configured to: determine transmit power of the first portion of the third subframe i+1 according to a priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

Further, the user equipment further includes: a fifth determining unit, configured to determine the fourth transmit power according to the priority of the third channel and the priority of the fourth channel; and a sixth determining unit, configured to determine the second power upper limit according to the third threshold and the fourth transmit power.

With reference to the foregoing embodiments, the user equipment further includes: a seventh determining unit, configured to determine that a current mode of the UE is an asynchronous dual connectivity DC mode.

With reference to the foregoing embodiments, the user equipment further includes: a receiving unit, configured to receive reference time window information sent by the first network side device or the second network side device, where the reference time window information is used to determine a subframe that needs to be used as a reference during allocation of the first transmit power and the second transmit power.

With reference to the foregoing embodiments, the user equipment further includes: an eighth determining unit, configured to at least determine that the priority of the third channel is higher than or equal to the priority of the fourth channel.

With reference to the foregoing embodiments, when the priority of the first channel is higher than the priority of the second channel, the allocation unit 202 is configured to: determine whether required power of the first subframe j is greater than the first power upper limit; when the required power is greater than the first power upper limit, compress the required power to obtain the first transmit power that is less than or equal to the first power upper limit, or determine the first power upper limit as the first transmit power; or when the required power is less than or equal to the first power upper limit, use the required power as the first transmit power; and allocate, to the second subframe i, the second transmit power that is less than or equal to a difference between the first threshold and the first transmit power.

With reference to the foregoing embodiments, when the priority of the first channel is equal to the priority of the second channel, the allocation unit 202 is configured to: determine first required sub-power of the first subframe j and second required sub-power of the second subframe i, and determine whether a power sum of the first required sub-power and the second required sub-power is greater than the first threshold; and when the power sum is less than or equal to the first threshold, use a smaller value of the first required sub-power and the first power upper limit as the first transmit power, and use the second required sub-power as the second transmit power; or when the power sum is greater than the first threshold, compress the first required sub-power and the second required sub-power in equal proportion, to respectively obtain first compressed required sub-power corresponding to the first required sub-power and second compressed required sub-power corresponding to the second required sub-power, where a sum of the first compressed required sub-power and the second compressed required sub-power is less than or equal to the first threshold; and use a smaller value of the first compressed required sub-power and the first power upper limit as the first transmit power, and allocate, to the second subframe i, the second transmit power that is less than or equal to a difference between the first threshold and the first transmit power.

With reference to the foregoing embodiments, the second transmit power is less than or equal to a difference between a fourth threshold and the third power upper limit of a subframe j−1, where the subframe j−1 is a previous subframe of the first subframe j, and the subframe j−1 is used to send data to the first network side device.

With reference to the foregoing embodiments, the user equipment further includes: a ninth determining unit, configured to determine that the first network side device is a secondary network side device SeNB; and determine that the second network side device is a master network side device MeNB.

Various variation forms and specific examples in the power configuration method in the embodiment in FIG. 3 are also applicable to the user equipment in this embodiment. From the foregoing detailed description of the power configuration method, a person skilled in the art can clearly know an implementation method of the user equipment in this embodiment. For brevity of the specification, details are not described herein again.

Embodiment 3

Figure 8:
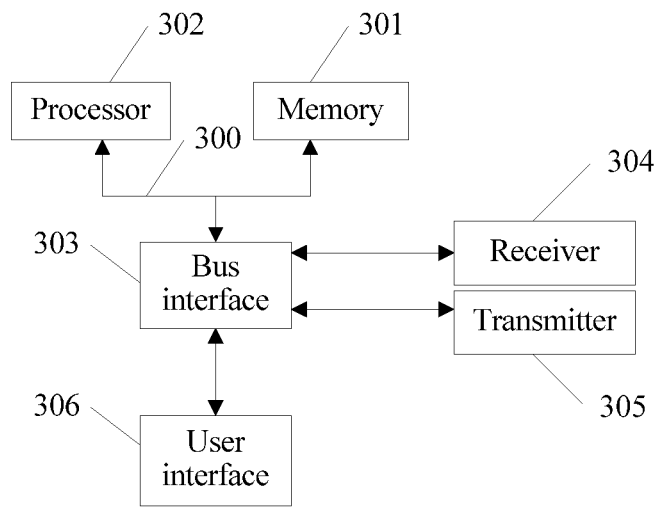
FIG. 8 is a conceptual diagram of a hardware implementation instance of user equipment according to an embodiment.

An embodiment further provides user equipment. Referring to FIG. 8, FIG. 8 is a block diagram of a hardware implementation instance of the user equipment. The user equipment includes: a memory 301, configured to store an instruction; and a processor 302, coupled to the memory 301, where the processor 302 runs the stored instruction to perform the following steps: when the user equipment sends data to a first network side device over a first channel and the user equipment sends data to a second network side device over a second channel, determining that the first channel separately overlaps the second channel and a third channel, where an overlap portion exists between a first portion of a first subframe j in which the first channel is located and a second subframe i in which the second channel is located; and an overlap portion exists between a second portion, other than the first portion, of the first subframe j and a first portion of a third subframe i+1 in which the third channel is located, where the third subframe i+1 is a next subframe of the second subframe i, and the third subframe i+1 is used to send data to the second network side device; and allocating, according to a priority of the first channel and a priority of the second channel, first transmit power to the first portion of the first subframe j and the second portion of the first subframe j, and second transmit power to the second subframe i, where the first transmit power is less than or equal to a first power upper limit, a sum of the first transmit power and the second transmit power is less than or equal to a preset first threshold, and a sum of third transmit power of the third subframe i+1 and the first power upper limit is less than or equal to a preset second threshold.

In FIG. 8, in a bus architecture (indicated by using a bus 300), the bus 300 may include any quantity of interconnected buses and bridges, and the bus 300 interconnects various circuits including one or more processors represented by the processor 302 and one or more memories represented by the memory 301. The bus 300 may further interconnect various other circuits such as a peripheral device, a voltage regulator, and a power management circuit. These are all well known in the art, and therefore are not further described in the specification. A bus interface 303 provides interfaces between the bus 300 and a receiver 304, and between the bus 300 and a transmitter 305. The receiver 304 and the transmitter 305 may be a same component, that is, a transceiver, which provides a unit configured to communicate with various types of other apparatuses over a transmission medium. Depending on nature of the user equipment, a user interface 306 may further be provided, for example, a keypad, a display, a loudspeaker, a microphone, and a joystick.

The processor 302 is responsible for management of the bus 300 and general processing, while the memory 301 may be configured to store data used when the processor 302 performs an operation.

Optionally, the processor 302 is further configured to: before the allocating, according to a priority of the first channel and a priority of the second channel, first transmit power to the first portion of the first subframe j and the second portion of the first subframe j, and second transmit power to the second subframe i, determine the third transmit power according to at least a priority of the third channel and the priority of the first channel; and determine the first power upper limit according to the second threshold and the third transmit power.

Further, the processor 302 is configured to: before the determining the third transmit power according to at least a priority of the third channel and the priority of the first channel, determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; determine transmit power of the first portion of the third subframe i+1 according to the priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

Optionally, after the first subframe j and the second subframe i are sent, the processor 302 is configured to: when the user equipment sends data to the first network side device over a fourth channel and the user equipment sends data to the second network side device over the third channel, determine that the fourth channel separately overlaps the third channel and a fifth channel, where an overlap portion exists between a first portion of a fourth subframe j+1 in which the fourth channel is located and the third subframe i+1; and an overlap portion exists between a second portion, other than the first portion, of the fourth subframe j+1 and a first portion of a fifth subframe i+2 in which the fifth channel is located, where the fifth subframe i+2 is a next subframe of the third subframe i+1, and the fifth subframe i+2 is used to send data to the second network side device; and allocate, according to a priority of the fourth channel and a priority of the third channel, fourth transmit power to the first portion of the fourth subframe j+1 and the second portion of the fourth subframe j+1, and actual transmit power to the third subframe i+1, where the fourth transmit power is less than or equal to a third power upper limit, and the actual transmit power is less than or equal to a difference between the second threshold and the first power upper limit; a sum of the fourth transmit power and the actual transmit power is less than or equal to a preset fifth threshold; and a sum of fifth transmit power of the fifth subframe i+2 and the third power upper limit is less than or equal to a preset sixth threshold.

Optionally, the processor 302 is further configured to: before the allocating, according to a priority of the first channel and a priority of the second channel, first transmit power to the first portion of the first subframe j and the second portion of the first subframe j, and second transmit power to the second subframe i, determine that the third channel overlaps a fourth channel, where an overlap portion exists between a second portion, other than the first portion of the third subframe i+1, of the third subframe i+1 and a first portion of a fourth subframe j+1 in which the fourth channel is located, the fourth subframe j+1 is a next subframe of the first subframe j, and the fourth subframe j+1 is used to send data to the first network side device; determine transmit power of the first portion of the third subframe i+1 according to a priority of the third channel and the priority of the first channel; determine transmit power of the second portion of the third subframe i+1 according to the priority of the third channel and a priority of the fourth channel; and determine the third transmit power according to the transmit power of the first portion of the third subframe i+1 and the transmit power of the second portion of the third subframe i+1, where the third transmit power is less than or equal to a second power upper limit, and a sum of the second power upper limit and fourth transmit power of the fourth subframe j+1 is less than or equal to a preset third threshold.

Further, the processor 302 is further configured to: before the determining the third transmit power according to the transmit power of the first portion of the third subframe i+1 and the transmit power of the second portion of the third subframe i+1, determine the fourth transmit power according to the priority of the third channel and the priority of the fourth channel; and determine the second power upper limit according to the third threshold and the fourth transmit power.

With reference to the foregoing embodiments, the processor 302 is further configured to: before the allocating first transmit power to the first portion of the first subframe j and the second portion of the first subframe j, and second transmit power to the second subframe i, determine that a current mode of the UE is an asynchronous dual connectivity DC mode.

With reference to the foregoing embodiments, the user equipment further includes: a receiver 304, configured to: before the UE allocates the first transmit power to the first portion and the second portion, other than the first portion, of the first subframe j and allocates the second transmit power to the second subframe i of the second channel, receive reference time window information sent by the first network side device or the second network side device, where the reference time window information is used to determine a subframe that needs to be used as a reference during allocation of the first transmit power and the second transmit power.

With reference to the foregoing embodiments, the processor 302 is further configured to: before the UE allocates the first transmit power to the first portion and the second portion, other than the first portion, of the first subframe j and allocates the second transmit power to the second subframe i of the second channel, at least determine that the priority of the third channel is higher than or equal to the priority of the fourth channel.

With reference to the foregoing embodiments, the processor 302 is configured to: determine whether required power of the first subframe j is greater than the first power upper limit; when the required power is greater than the first power upper limit, compress the required power to obtain the first transmit power that is less than or equal to the first power upper limit, or determine the first power upper limit as the first transmit power; or when the required power is less than or equal to the first power upper limit, use the required power as the first transmit power; and allocate, to the second subframe i, the second transmit power that is less than or equal to a difference between the first threshold and the first transmit power.

With reference to the foregoing embodiments, the processor 302 is configured to: determine first required sub-power of the first subframe j and second required sub-power of the second subframe i, and determine whether a power sum of the first required sub-power and the second required sub-power is greater than the first threshold; and when the power sum is less than or equal to the first threshold, use a smaller value of the first required sub-power and the first power upper limit as the first transmit power, and use the second required sub-power as the second transmit power; or when the power sum is greater than the first threshold, compress the first required sub-power and the second required sub-power in equal proportion, to respectively obtain first compressed required sub-power corresponding to the first required sub-power and second compressed required sub-power corresponding to the second required sub-power, where a sum of the first compressed required sub-power and the second compressed required sub-power is less than or equal to the first threshold; and use a smaller value of the first compressed required sub-power and the first power upper limit as the first transmit power, and allocate, to the second subframe i, the second transmit power that is less than or equal to a difference between the first threshold and the first transmit power.

With reference to the foregoing embodiments, the second transmit power is less than or equal to a difference between a fourth threshold and the third power upper limit of a subframe j−1, where the subframe j−1 is a previous subframe of the first subframe j, and the subframe j−1 is used to send data to the first network side device.

With reference to the foregoing embodiments, the first network side device is a secondary network side device SeNB; and it is determined that the second network side device is a master network side device MeNB.

Various variation forms and specific examples in the power configuration method in the embodiment in FIG. 3 are also applicable to the user equipment in this embodiment. From the foregoing detailed description of the power configuration method, a person skilled in the art can clearly know an implementation method of the user equipment in this embodiment. For brevity of the specification, details are not described herein again.

Embodiment 4

Figure 9:
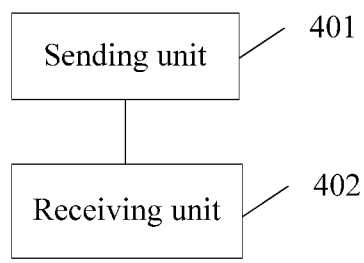
FIG. 9 is a functional block diagram of a base station according to an embodiment.

An embodiment provides a base station. Referring to FIG. 9, the base station includes: a sending unit 401, configured to send reference time window information to user equipment UE, where the reference time window information is used to indicate, to the UE, a subframe that needs to be used as a reference during allocation of first transmit power to a first subframe j in which a first channel is located and second transmit power to a second subframe i in which a second channel is located; and a receiving unit 402, configured to receive data on the first channel sent by the UE at the first transmit power or data on the second channel sent by the UE at the second manner power.

Various variation forms and specific examples in the power configuration method in the foregoing embodiment are also applicable to the base station in this embodiment. From the foregoing detailed description of the power configuration method, a person skilled in the art can clearly know an implementation method of the base station in this embodiment. For brevity of the specification, details are not described herein again.

Embodiment 5

Figure 10:
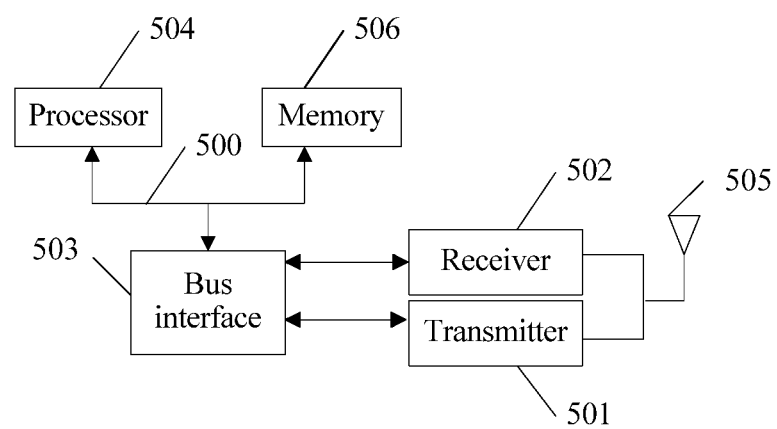
FIG. 10 is a conceptual diagram of a hardware implementation instance of a base station according to an embodiment.

An embodiment provides a base station. Referring to FIG. 10, FIG. 10 is a conceptual diagram of a hardware implementation example of the base station. The base station includes: a transmitter 501, configured to send reference time window information to user equipment UE, where the reference time window information is used to indicate, to the UE, a subframe that needs to be used as a reference during allocation of first transmit power to a first subframe j in which a first channel is located and second transmit power to a second subframe i in which a second channel is located; and a receiver 502, configured to receive data on the first channel sent by the UE at the first transmit power or data on the second channel sent by the UE at the second manner power.

Further, in FIG. 10, in a bus architecture (indicated by using a bus 500), the bus 500 may include any quantity of interconnected buses and bridges, and the bus 500 interconnects various circuits including one or more processors represented by the processor 504 and one or more memories represented by the memory 506. The bus 500 may further interconnect various other circuits such as a peripheral device, a voltage regulator, and a power management circuit. These are all well known in the art, and therefore are not further described in the specification. A bus interface 503 provides interfaces between the bus 500 and a receiver 502, and/or between the bus 500 and a transmitter 501. The receiver 502 and the transmitter 501 may be a same component, that is, a transceiver, which provides a unit configured to communicate with various types of other apparatuses over a transmission medium. Data processed by using the processor 504 is transmitted over a wireless medium through an antenna 505. Further, the antenna 505 further receives data and transfers the data to the processor 504.

The receiver 502 further receives data by using the antenna 505, processes the data to restore information that is modulated to a carrier, and provides the information restored by the receiver 502 to a receive frame processor, which parses each frame. The receiving frame processor performs decoding on the frames, and provides a successfully decoded control signal to the processor 504. If there are some frames that cannot be successfully decoded by the receiving processor, the processor 504 may further use an ACK and/or NACK protocol to support retransmission requests for those frames.

The processor 504 is responsible for management of the bus 500 and general processing, and may further provide various functions, including timing, a peripheral interface, voltage regulation, power management, and other control functions. The memory 506 may be configured to store data used when the processor 504 performs an operation.

Various variation forms and specific examples in the power configuration method in the foregoing embodiment are also applicable to the base station in this embodiment. From the foregoing detailed description of the power configuration method, a person skilled in the art can clearly know an implementation method of the base station in this embodiment. For brevity of the specification, details are not described herein again.

One or more technical solutions provided in the embodiments have at least the following technical effects or advantages:

According to a power configuration method in an embodiment, when user equipment UE sends data to a first network side device over a first channel and the UE sends data to a second network side device over a second channel, according to a priority of the first channel and a priority of the second channel, first transmit power is allocated to a first portion of a first subframe j and a second portion of the first subframe j and second transmit power is allocated to a second subframe i, where the first transmit power is less than or equal to a first power upper limit, a sum of the first transmit power and the second transmit power is less than or equal to a preset first threshold, and a sum of transmit power of the first portion of the third subframe i+1 and the first power upper limit is less than or equal to a preset second threshold. Therefore, in this embodiment, not only the priorities of the first channel and the second channel but also an upper limit of the first transmit power is considered during allocation of the first transmit power, and the first power upper limit is related to the transmit power of the first portion of the third subframe i+1. In other words, in this embodiment, the first power upper limit is set for the first transmit power with reference to transmit power required for the third subframe i+1, instead of considering only a requirement of a current transmit subframe, so that a requirement of a subframe to be subsequently sent is ensured. Therefore, power configured by using the power configuration method in this embodiment is more proper, ensuring that power is properly allocated to important information.

A person skilled in the art should understand that the embodiments may be provided as a method, a system, or a computer program product. Therefore, this disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

This disclosure is described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A power configuration method, comprising:
    in response to a user equipment (UE) sending data to a first network side device over a first channel and the UE sending data to a second network side device over a second channel, determining that the first channel separately overlaps the second channel and a third channel, wherein an overlap portion exists between a first time interval j in which the first channel is located and a second time interval i in which the second channel is located, wherein an overlap portion exists between the first time interval j and a third time interval i+1 in which the third channel is located, wherein the third time interval i+1 is a next time interval of the second time interval i, and wherein the third time interval i+1 is used to send data to the second network side device; and
    allocating, according to a priority of the first channel and a priority of the second channel, a first transmit power of the first time interval j, and a second transmit power to the second time interval i, wherein the first transmit power is less than or equal to a first power upper limit, wherein a sum of the first transmit power and the second transmit power is less than or equal to a preset first threshold, and wherein a sum of a third transmit power of the third time interval i+1 and the first power upper limit is less than or equal to a preset second threshold.

2. The power configuration method according to claim 1, wherein before the allocating, according to the priority of the first channel and the priority of the second channel, the first transmit power of the first time interval j, and the second transmit power to the second time interval i, the method further comprises:
    determining the third transmit power according to a priority of the third channel and the priority of the first channel; and
    determining the first power upper limit according to the preset second threshold and the third transmit power.

3. The power configuration method according to claim 1, wherein the allocating comprises allocating, by the UE, the first transmit power to a first portion and a second portion other than the first portion, of the first time interval j, and the second transmit power to the second time interval i of the second channel.

4. The power configuration method according to claim 3, wherein, before the allocating the first transmit power to the first portion and the second portion of the first time interval j, and the second transmit power to the second time interval i of the second channel, the method further comprises:
    determining the third transmit power; and
    determining that the priority of the third channel is higher than or equal to a priority of a fourth channel, wherein a fourth time interval j+1 in which the fourth channel is located is a next time interval of the first time interval j, and the fourth time interval j+1 is used to send data to the first network side device.

5. The power configuration method according to claim 3, wherein before the allocating the first transmit power to the first portion of the first time interval j and the second portion of the first time interval j, and the second transmit power to the second time interval i of the second channel, the method further comprises:
    determining that the first network side device is a secondary network side device (SeNB); and
    determining that the second network side device is a master network side device (MeNB).

6. A user equipment, comprising:
    a non-transitory memory configured to store an instruction; and
    a processor coupled to the non-transitory memory, wherein the processor the processor is configured to run the instruction stored in the non-transitory memory to perform the following:
    in response to the user equipment sending data to a first network side device over a first channel and the user equipment sending data to a second network side device over a second channel, determine that the first channel separately overlaps the second channel and a third channel, wherein an overlap portion exists between a first time interval j in which the first channel is located and a second time interval i in which the second channel is located, wherein an overlap portion exists between the first time interval j and a third time interval i+1 in which the third channel is located, wherein the third time interval i+1 is a next time interval of the second time interval i, and wherein the third time interval i+1 is used to send data to the second network side device; and
    allocate, according to a priority of the first channel and a priority of the second channel, a first transmit power of the first time interval j, and a second transmit power to the second time interval i, wherein the first transmit power is less than or equal to a first power upper limit, wherein a sum of the first transmit power and the second transmit power is less than or equal to a preset first threshold, and wherein a sum of a third transmit power of the third time interval i+1 and the first power upper limit is less than or equal to a preset second threshold.

7. The user equipment according to claim 6, wherein the processor is configured to run the instruction stored in the non-transitory memory to further perform the following, before the first transmit power and the second transmit power are allocated:
    determine the third transmit power according to at least a priority of the third channel and the priority of the first channel; and
    determine the first power upper limit according to the preset second threshold and the third transmit power.

8. The user equipment according to claim 6, wherein the processor is configured to run the instruction stored in the non-transitory memory to perform the allocating by being configured to run the instruction stored in the non-transitory memory to perform the following:
    allocate the first transmit power to a first portion and a second portion other than the first portion, of the first time interval j, and the second transmit power to the second time interval i of the second channel.

9. The user equipment according to claim 8, wherein the processor is configured to run the instruction stored in the non-transitory memory to further perform the following, before the first transmit power is allocated to the first portion and the second portion, and the second transmit power is allocated ot the second time interval i of the second channel:

determine the third transmit power; and determine that the priority of the third channel is higher than or equal to a priority of a fourth channel, wherein a fourth time interval j+1 in which the fourth channel is located is a next time interval of the first time interval j, the fourth time interval j+1 is used to send data to the first network side device.

10. The user equipment according to claim 8, wherein the first network side device is a secondary network side device (SeNB), and the second network side device is a master network side device (MeNB).

* * * * *